(12) United States Patent
Bonacini

(10) Patent No.: US 7,896,054 B2
(45) Date of Patent: Mar. 1, 2011

(54) MACHINE FOR FITTING AND REMOVING WHEEL TIRES FOR VEHICLES

(75) Inventor: Maurizio Bonacini, Correggio (IT)

(73) Assignee: Giuliano, S.p.A., Correggio (IT)

( * ) Notice: Subject to any disclaimer, the term of this patent is extended or adjusted under 35 U.S.C. 154(b) by 90 days.

(21) Appl. No.: 12/292,439

(22) Filed: Nov. 19, 2008

(65) Prior Publication Data
US 2009/0126878 A1 May 21, 2009

(30) Foreign Application Priority Data
Nov. 21, 2007 (IT) .............................. MO2007A0350

(51) Int. Cl.
*B60C 25/138* (2006.01)
(52) U.S. Cl. .......................................... 157/1.24; 157/20
(58) Field of Classification Search .................. 157/1.24, 157/1.17, 20, 11, 1.1, 1.22, 1.28, 1, 24
See application file for complete search history.

(56) References Cited

U.S. PATENT DOCUMENTS

| | | | | | |
|---|---|---|---|---|---|
| 3,008,512 | A | * | 11/1961 | Foster | 157/1.28 |
| 4,804,030 | A | * | 2/1989 | Mandelko | 157/1.17 |
| 6,619,362 | B2 | * | 9/2003 | Corghi | 157/1.24 |
| 7,341,090 | B2 | * | 3/2008 | Gonzaga | 157/1.17 |
| 7,500,504 | B2 | * | 3/2009 | Bonacini | 157/1.17 |
| 2004/0055712 | A1 | | 3/2004 | Corghi | |
| 2008/0060766 | A1 | | 3/2008 | Bonacini | |

FOREIGN PATENT DOCUMENTS
EP  0499825  8/1992

* cited by examiner

*Primary Examiner* — Hadi Shakeri
(74) *Attorney, Agent, or Firm* — Dykema Gossett PLLC (57) ABSTRACT

A machine for fitting and removing wheel tires for vehicles includes a supporting structure of a clamping and rotating device for clamping and rotating the wheel rim and an operating head for fitting/removing a tire onto/from the rim. The operating head has a removal tool associated with a first actuator and turnable between a first clamping position in which the tool is tilted towards the rotation axis of the rim, and a second entrainment position in which the tool extends along a direction substantially parallel to the rotation axis of the rim. The operating unit includes an arrangement for transforming the movement generated by a second actuator into the sideways movement of the operating head along a curved direction and near and away to a section of the annular flange of the rim.

29 Claims, 6 Drawing Sheets

MACHINE FOR FITTING AND REMOVING WHEEL TIRES FOR VEHICLES

BACKGROUND OF THE INVENTION

1. Field of the Invention

This invention relates to a machine for fitting and removing wheel tires for vehicles.

2. The Prior Art

As is known vehicle wheels include a metal rim having along the perimeter annular flanges adapted to house, as an adherent stop, the end portions, so-called "beads", of an elastic tire.

The use is currently known of so-called "tire changing" machines for fitting and removing tires from and onto their relevant rims for carrying out maintenance, repair or replacement jobs.

Such tire changing machines comprise, generally, a frame adapted to support a clamping and rotating device for clamping and rotating the rim of a wheel onto/from which the tire must be fitted/removed and one or more tools for fitting and removing the tire.

Automatic tire changing machines are particularly known that include an operating head which has a tool for removing the tire and which is associated with the frame and vertically and horizontally movable by respective actuators.

The removal tool is arranged along a substantially transversal direction with respect to the longitudinal axis of the operating head, towards the wheel to be removed, and has a curved end part adapted to grip the tire bead.

In particular, the removal tool is turnable by means of a respective actuator around a horizontal axis between a bead clamping configuration in which it is tilted towards the wheel rim, a first configuration of entrainment of the tire edge in which it is arranged substantially vertical, and a second configuration of entrainment of the tire edge in which it is tilted in an opposite direction with respect to the wheel rim.

During the operating phase, an operator positions and blocks the wheel on the clamping and rotating device and, by means of a specific beading unit, performs a preliminary phase to detach the tire bead from the annular flanges of the rim. Subsequently, the operator regulates the position of the operating head with respect to the frame according to the specific dimensions of the wheel.

In particular, such regulation is done by moving the operating head upwards by means of a first actuator and horizontally by means of a second actuator.

The head is then lowered and the end part of the tool presses the side of the tire until it is inserted between the tire bead and the relevant flange on the rim.

The operation of a third actuator permits moving the tool to clamping configuration, in which the hooked extremity of the tool positions so as to withhold the tire bead.

Afterwards, the tool is positioned in the first withholding configuration and the operating head is raised so as to extract a portion of the bead above the rim.

To make it easier to extract the bead, the tool is positioned in the second withholding configuration by means of the third actuator and, at the same time, to prevent the tire for becoming too deformed, the operating head is moved horizontally and, by means of the second actuator, towards the rotation axis of the rim.

The rotation of the rim then allows the entire bead to come out of the respective flange.

These machines of known type are however susceptible to upgrading, in particular in order to ensure a correct and easy removal of the tire, while at the same time allowing a more simple structure and operation.

The need to control and combine several actuators during the removal phase in fact requires the presence of a processing unit suitable for coordinating operation, with consequent increase in the general complexity of the machine.

The main aim of the present invention is to provide a machine for fitting and removing wheel tires for vehicles that allows achieving the above-mentioned standards of upgrading.

Another object of the present invention is to provide a machine for fitting and removing wheel tires for vehicles that allows achieving the mentioned standards of upgrading of the state of the art within a rational solution that is easy and effective to use and of low cost.

SUMMARY OF THE INVENTION

The above objects are all achieved by the present machine for fitting and removing wheel tires for vehicles, comprising a supporting structure of a clamping and rotating device for clamping and rotating the wheel rim for vehicles, at least an operating unit associated moving with said supporting structure and having at least an operating head for fitting/removing a tire onto/from said rim, said operating head having at least one removal tool associated with a first actuator and turnable between a first clamping position of at least a section of the bead of said tire, in which said tool is substantially tilted towards the rotation axis of said rim, and a second entrainment position of said bead section, in which said tool extends along a direction substantially parallel to the rotation axis of said rim, wherein said operating unit comprises a second actuator and a transformation arrangement for transforming the movement generated by said second actuator into the sideways movement of said operating head along a direction substantially curved between a first configuration, in which said operating head is substantially near to a section of the annular flange of said rim suitable for housing said bead section, and a second configuration in which said operating head is substantially away from said section of the annular flange of the rim.

Other characteristics and advantages of the present invention will be made clearer from the description of a preferred, but not sole embodiment of a machine for fitting and removing wheel tires for vehicles, including but not limited to that shown on the attached drawings.

DETAILED DESCRIPTION OF THE PREFERRED EMBODIMENT

With particular reference to such figures, a machine for fitting and removing wheel tires for vehicles is generally labeled 1.

With not exclusive reference to the specific embodiment of the machine 1 illustrated in the above figures, the structure 2 comprises a base 4 for supporting the clamping and rotating device 3 for clamping and rotating the rim A around a substantially vertical rotation axis D.

An operating unit 5 is associated with the structure 2 moving vertically along an upright 6 that elevates from the base 4; the operating unit 5 has an operating head 7 for fitting/removing the tire C.

The operating head 7 has a tool 8 for removing the tire C which is substantially elongated in shape, which extends towards the wheel B and which has a free extremity with a hooked end section suitable for tallying with a section of the bead E of the tire C.

Figure 1:
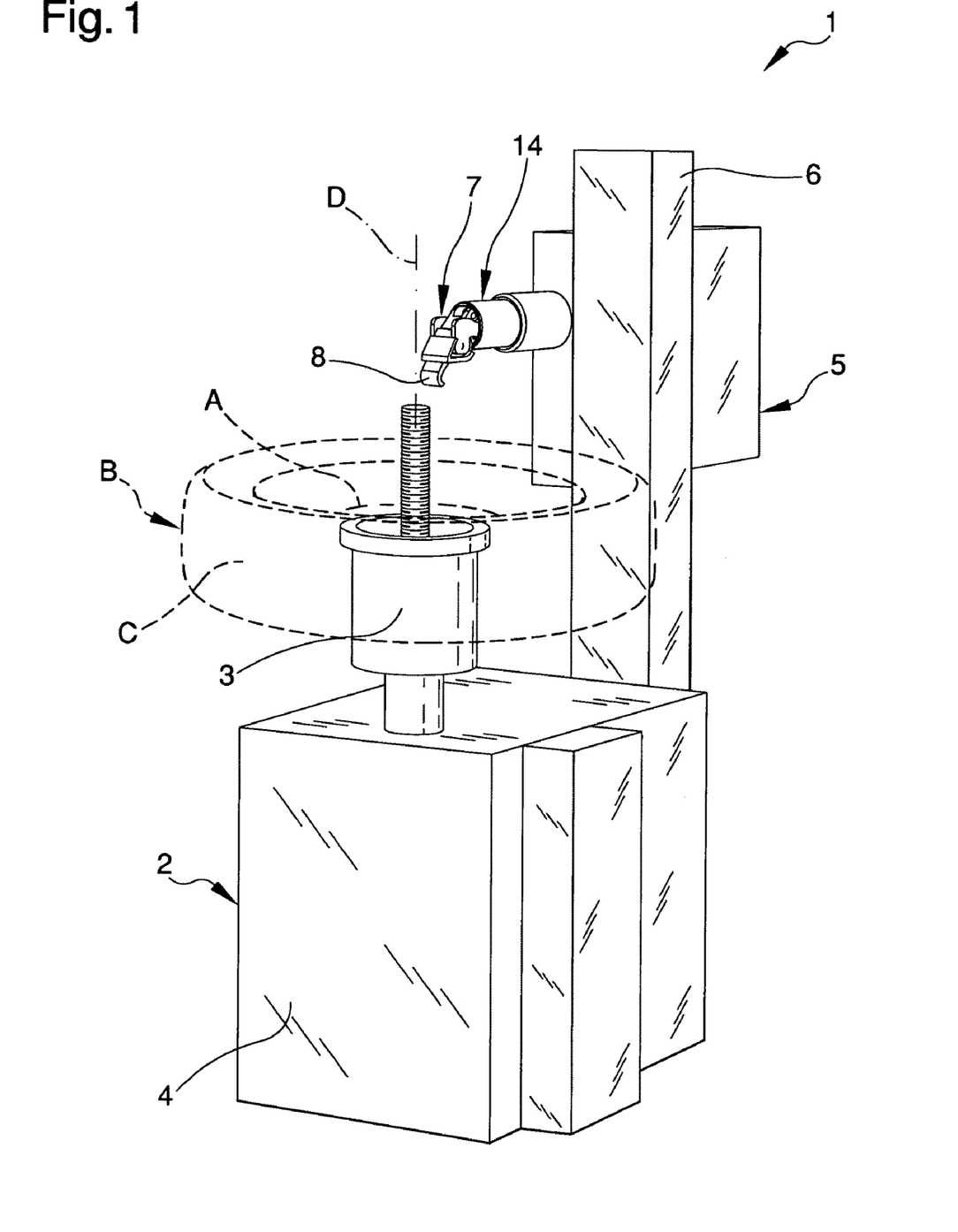
FIG. 1 is a schematic axonometric view of the machine according to the invention.
Figure 2:
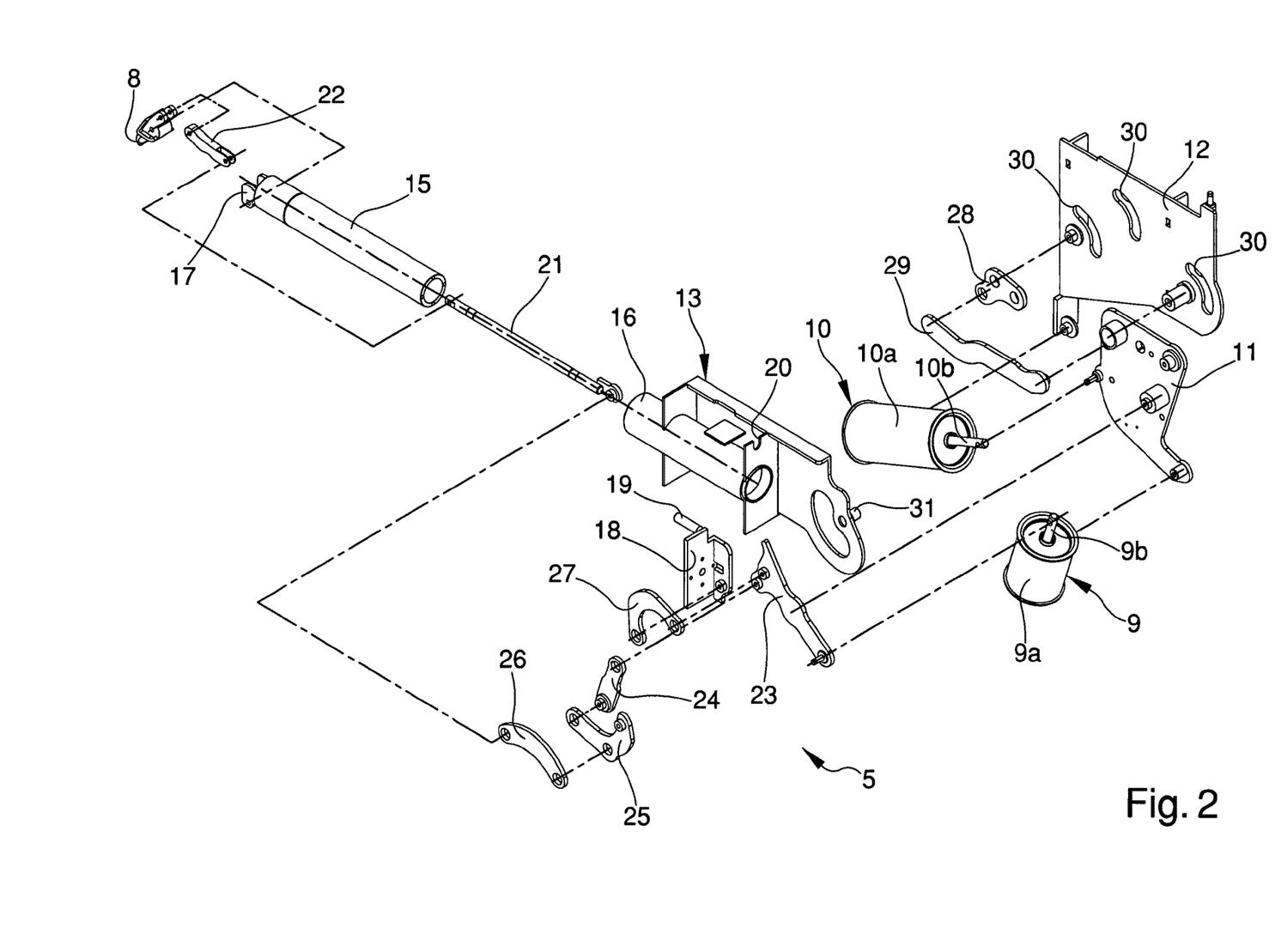
FIG. 2 is an axonometric and exploded view of the operating unit of the machine according to the invention.
Figure 3:
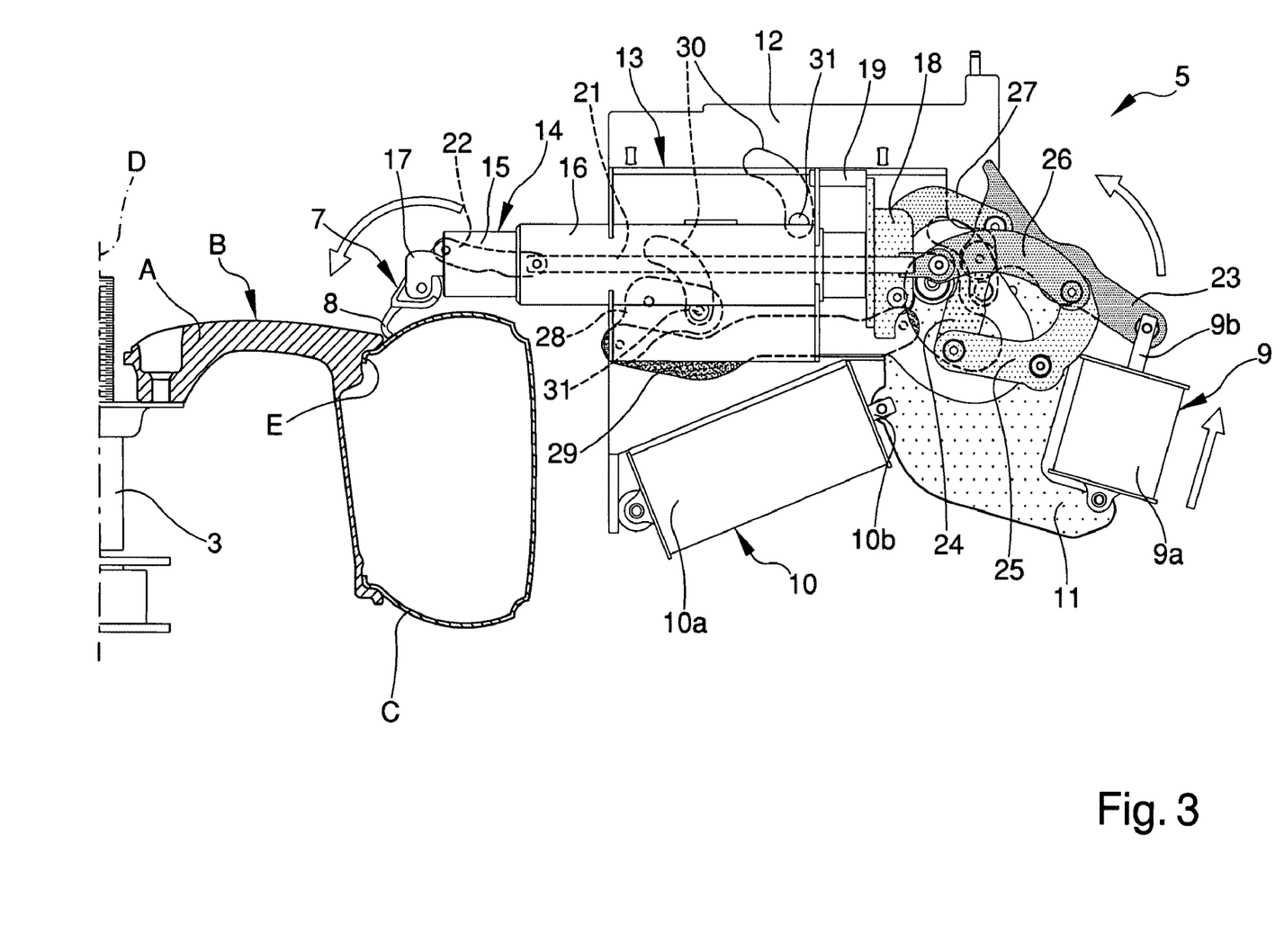
FIG. 3 is a side view of the machine operating unit according to the invention with the operating head in the first configuration and the tool in the first clamping position.
Figure 4:
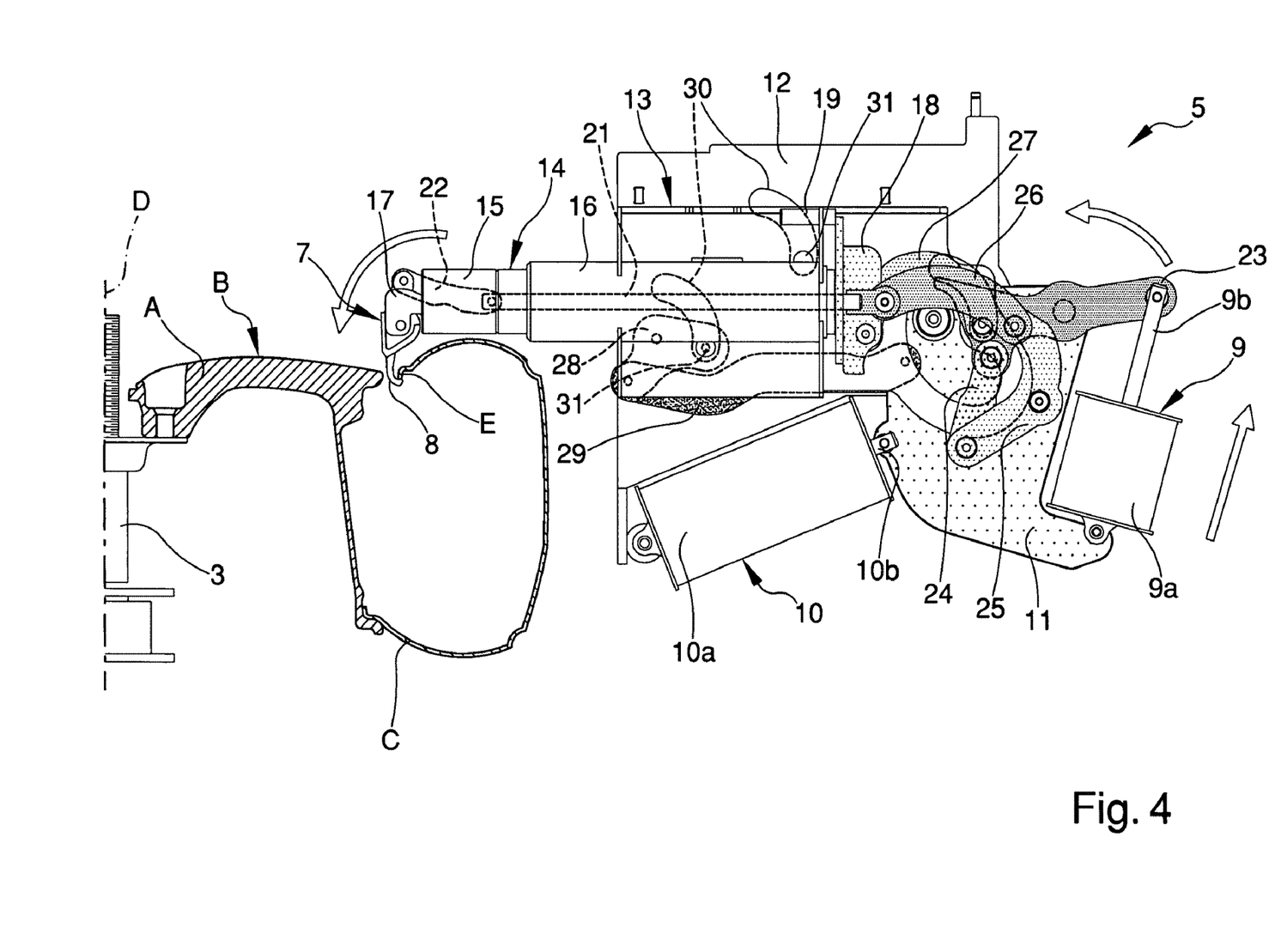
FIG. 4 is a side view of the machine operating unit according to the invention with the operating head in the first configuration and the tool in the second entrainment position.

The tool 8 is turnable by means of a first actuator 9 between a first clamping position of the section of the bead E, in which it is substantially tilted towards the rotation axis D of the rim A (FIG. 3), and a second position of entrainment of such section of the bead E, in which it is substantially vertical (FIG. 4). The operating head 7 can be moved horizontally sideways closer to or away from the rotation axis D of the rim A, at the same time as the rotation of the tool 8 between the first and the second position.

The rotation and the simultaneous horizontal sideways movement of the tool 8 allows exercising a pressure on the side of the tire C, near the rim A, until this permits, in the second position, the gripping of the hooked section of the tool 8 on the section of the bead E.

The operating unit 5 comprises a second actuator 10 and a transformation arrangement for transforming the movement generated by said second actuator 10 into the sideways movement of the operating head 7 in a substantially curved direction.

Figure 6:
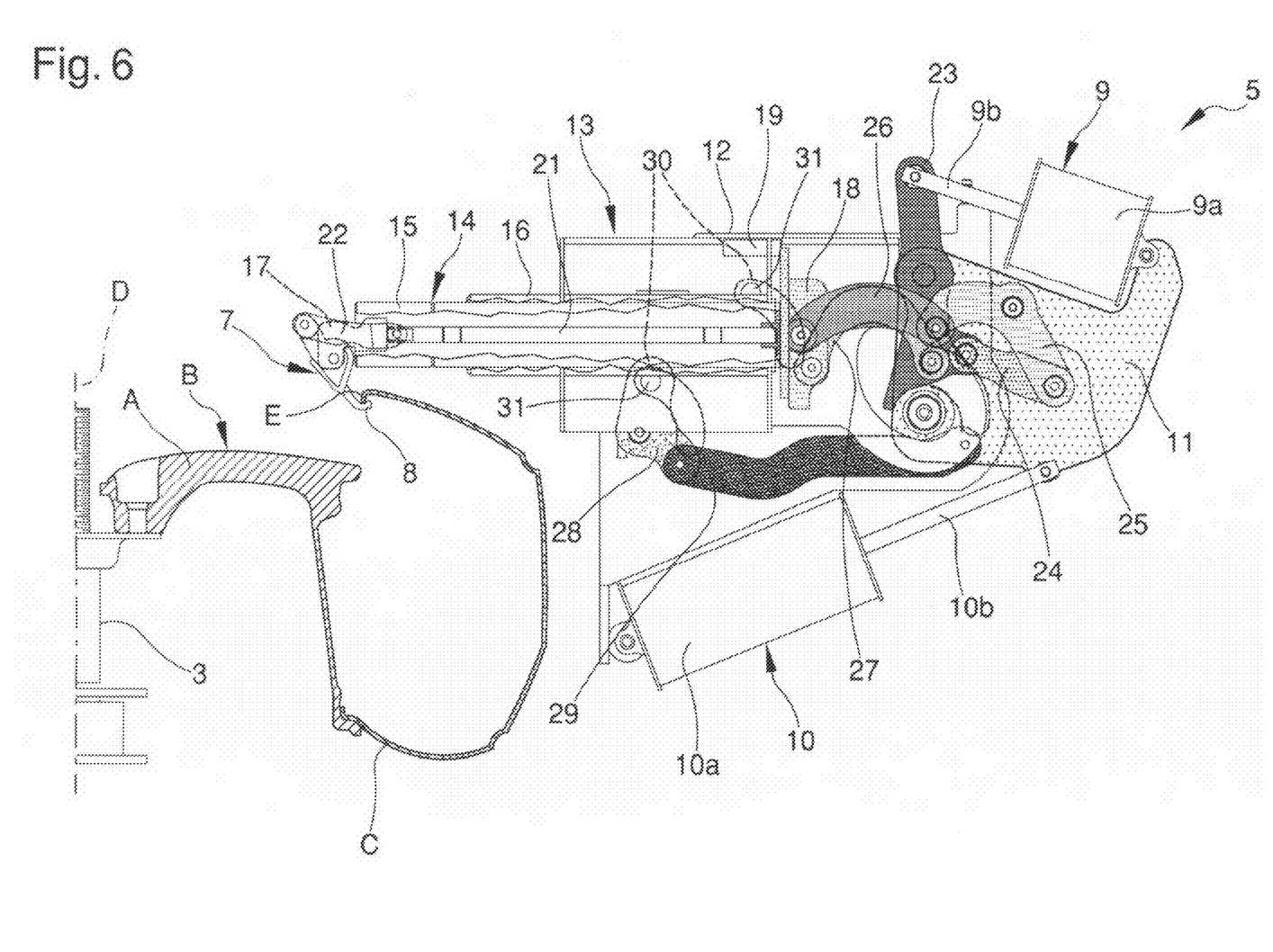

In particular, the operating head 7 moves sideways between a first configuration, in which it is substantially near the section of annular flange of the rim A which is suitable for housing the section of the bead E to be extracted (FIGS. 3 and 4), and a second configuration, in which it is substantially away from such section of the annular flange (FIG. 6). Furthermore, during the sideways movement between the first and the second configuration, the operating head 7 moves closer to the rotation axis D.

Such sideways movement of the operating head 7 permits extracting the section of the bead E gripped by means of the tool 8 by the respective annular flange on the rim A and conveying it above the rim itself and, advantageously, to the least possible distance from it.

The operating unit 5 comprises a transmission element 11 suitable for transmitting the movement generated by the second actuator 10 to the tool 8, during the sideways movement of the operating head 7, for the rotation of the tool 8 between the above second position and a third position of entrainment of the section of the bead E, in which it is substantially tilted in the opposite direction with respect to the rotation axis of the rim A (FIG. 6).

Such further sideways movement of the tool 8 towards the above third position makes it possible to move the section of the bead E away from the rim A, maintaining a perfect grip on the bead itself and avoiding, at the same time, excessive tensions and deformations of the tire C.

In particular, a first system of levers is associated with the first actuator 9 and with the tool 8 and permits the movement of the tool itself between the first and the second position.

The above transformation arrangement is composed of a second system of levers associated with the second actuator 10 and with the operating head 7, while the transmission element 11 are composed of at least a connecting element between the first and the second system of levers.

The presence of the transmission element 11 permits moving the operating head 7 between the first and the second configuration and, at the same time, the tool 8 between the second and the third position, in a synchronous way and by operating only the second actuator 10.

With particular but not sole reference to the embodiment of the machine 1 shown in the above figures, the operating unit 5 comprises a carriage 12 associated with the upright 6 moving in a vertical direction.

The operating unit 5 also comprises a slide 13 for supporting the operating head 7 associated with the carriage 12 moving between the above first and second configurations.

In particular, a substantially horizontal arm 14 is associated with the axially sliding slide 13 and has a free extremity with the operating head 7.

The arm 14 comprises a substantially tubular outer body 15 which is fitted sliding to measure inside a respective tubular liner 16 of the slide 13.

In particular, the outer body 15 has, at one extremity, a support 17 for the tool 8 and, at the opposite extremity, a bracket 18 associated with the first system of levers. Usefully, the bracket 18 has a stop device 19 that extends substantially horizontal and which is fitted sliding to measure inside a corresponding groove 20 on the slide 13. The stop device 19 is suitable for preventing the rotation of the outer body 15 with respect to the tubular liner 16.

The arm 14 also comprises a linking element of substantially elongated shape, arranged axially sliding inside the outer body 15 and provided with one extremity associated with the first system of levers and an opposite extremity associated with the tool 8.

In particular, the linking element is composed of a rod 21 having a first extremity protruding from the outer body 15 and associated with the first system of levers, and at least a small connecting rod 22 hinged on a second extremity of the rod 21.

The tool 8 has the extremity opposite the above hooked section hinged to the small connecting rod 22 and has its fulcrum fastened, on a substantially intermediate section, to the support 17.

The movement of the rod 21 inside the outer body 15, combined with the sliding of the outer body 15 inside the tubular liner 16, thus allows the sideways movement and variation of the angle of the tool 8.

The first actuator 9 is composed of a linear actuator of the type, for example, of a fluid-means actuator, and comprises a fixed portion 9a associated integral with the transmission element 11. In particular, the transmission element 11 is made of a plate supporting the first actuator 9, that is hinged to the carriage 12 and which is turnable by means of the second actuator 10.

The first system of levers comprises a first lever 23 which has an extremity hinged to a moving portion 9b of the first actuator 9 which has a substantially median section hinged to the transmission element 11.

The first system of levers comprises a first connecting rod 24 having an extremity hinged to the first lever 23, at the extremity opposite the first actuator 9.

A second lever 25 has an extremity hinged to the first connecting rod 24, at the extremity opposite the first lever 23, and has a substantially median section with fulcrum fastened on the transmission element 11.

A second connecting rod 26 is hinged to the second lever 25, at an extremity opposite the first connecting rod 24, and is hinged to the first protruding extremity of the rod 21.

The first lever 23, the first connecting rod 24, the second lever 25, the second connecting rod 26 and the transmission element 11 are suitably shaped and connected the one to the other so as to allow the axial sliding of the rod 21, and the contemporaneous rotation of the tool 8, by means of operation of the first actuator 9.

The first system of levers comprises a third connecting rod 27 which has an extremity hinged to the first lever 23, at the extremity opposite the first actuator 9, and which has the opposite extremity hinged to the bracket 18 of the outer body 15 of the arm 14.

The first lever 23, the third connecting rod 27 and the transmission element 11 are suitably shaped and connected the one to the other so as to allow the axial sliding of the outer body 15 inside the tubular liner 16, and the consequent rotation of the tool 8, by means of the operation of the first actuator 9.

The second actuator 10 is composed of a linear actuator of the type, for example, of a fluid-means actuator, and comprises a fixed portion 10a associated integral with the carriage 12, and a moving portion 10b to which is hinged the transmission element 11.

The second system of levers comprises a third lever having an extremity hinged to the moving portion 10b of the second actuator 10, a section with fulcrum fastened to the carriage 12 and an extremity associated with the slide 13.

With reference including but not limited to the particular embodiment of the machine 1 shown in the above figures, such third lever coincides with the transmission element 11.

The second system of levers also comprises a fourth lever 28 that has an extremity hinged to the slide 13 and a substantially intermediate section with fulcrum fastened to the carriage 12.

A fourth connecting rod 29 is hinged to the fourth lever 28, at an extremity substantially opposite the extremity hinged to the slide 13, and is hinged to the transmission element 11.

The fourth lever 28, the fourth connecting rod 29 and the transmission element 11 are suitably shaped and connected together so as to allow the sideways movement of the slide 13, with respect to the carriage 12, between the above first and second configurations and by means of the operation of the second actuator 10.

The operating unit 5 comprises a guide element for guiding the sideways movement of the slide 13 on the carriage 12.

Such guide element comprise a plurality of curved slots 30 defined on a substantially vertical wall of the carriage 12, inside which are engaged sliding respective pins 31 associated integral with the slide 13.

In particular, one of the pins 31 is composed of the hinging pin that hinges the fourth lever 28 to the slide 13.

A further pair of pins 31 is defined on a substantially vertical wall of the slide 13 and fits sliding into respective curved slots 30.

Each of the curved slots 30 describes an arc of a circle suitable for reproducing the trajectory of the sideways movement of the slide 13, determined by the particular shape and position of the fourth lever 28 and of the transmission element 11.

An operator positions and secures the wheel B on the clamping and rotating device 3 and, by means of a special beading tool, performs a preliminary phase of detachment of the bead E from the respective annular flange on the rim A.

Afterwards, the operator adjusts the position of the operating head 7 with respect to the structure 2 according to the specific dimensions of the wheel B, until the hooked extremity of the tool 8 comes into contact with the side of the tire C, near to the rim A (FIG. 3).

Such adjustment can be made by means of the sliding of the carriage 12 along the upright 6 and, for example, by means of the movement of the clamping and rotating device 3 closer to or away from the upright itself.

The first actuator 9 is then operated and the tool 8 turns from the first position towards the second position, at the same time as the horizontal sideways movement of the operating head 7 towards the rotation axis D, inserting itself between the side of the tire C and the rim A until it grips a section of the bead E with the hooked extremity (FIG. 4).

In particular, the action of the first actuator 9 on the first lever 23 produces a thrust by means of the second connecting rod 26 on the rod 21, which runs inside the outer body 15 towards the rotation axis D of the wheel B.

At the same time, the action of the first actuator 9 on the first lever 23 produces a thrust by means of the third connecting rod 27 on the outer body 15 of the arm 14, which runs inside the tubular liner 16 and moves the operating head 7 towards the rotation axis D.

Figure 5:
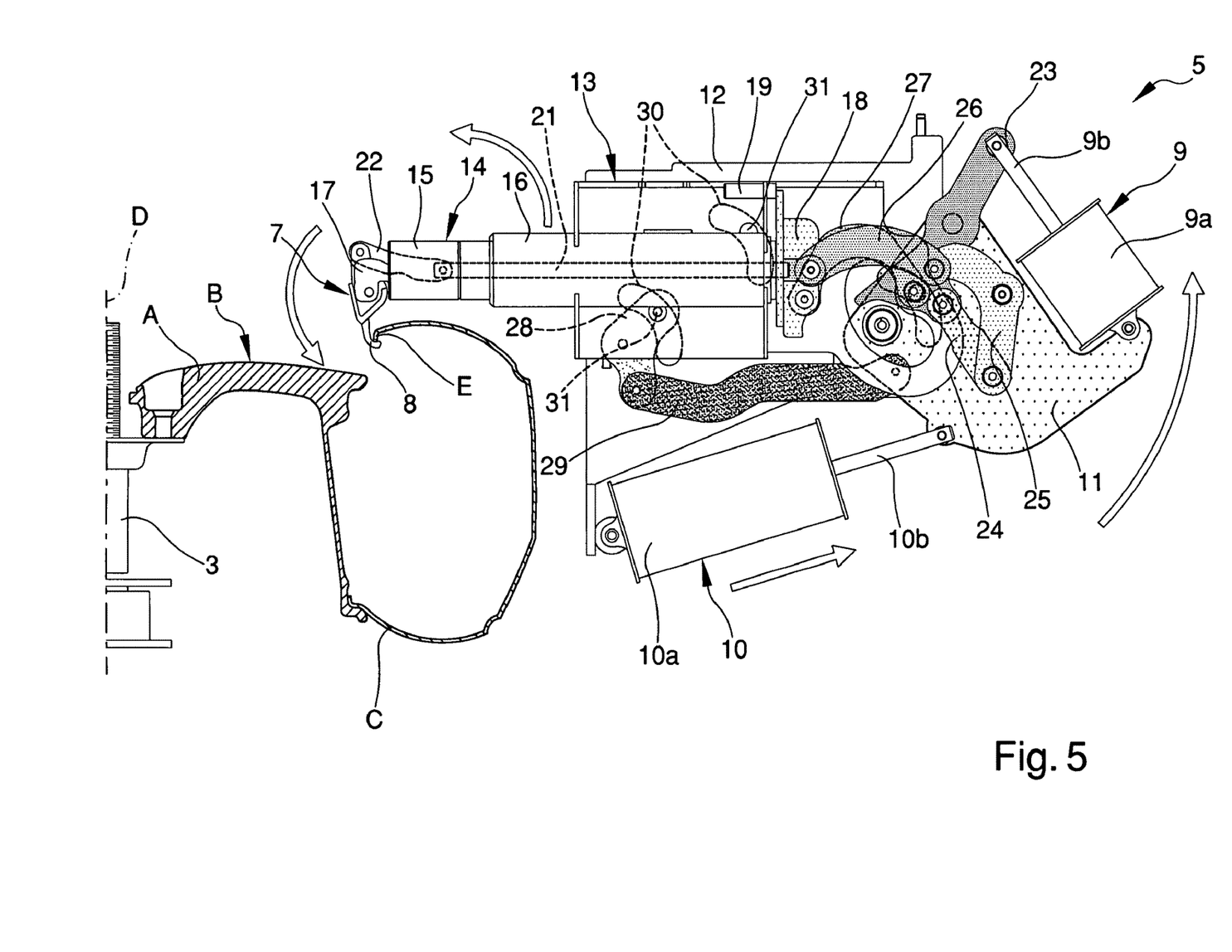
FIGS. 5 and 6 are side views of the machine operating unit according to the invention which illustrate the side movement of the operating head from the first configuration to the second configuration.

Afterwards, the operation of the second actuator 10 produces the sideways movement of the slide 13 with respect to the carriage 12 from the first configuration to the second configuration and, at the same time, the rotation of the tool 8 from the second position to the third position (FIGS. 5 and 6).

In particular, the action of the second actuator 10 produces the rotation of the transmission element 11 and, consequently, the rotation of the fourth lever 28 connected to the transmission element 11 by means of the fourth connecting rod 29. This produces a thrust on the slide 13 which moves sideways in the above-mentioned curved direction from the first to the second configuration.

This sideways movement is also supported by the sliding of the pins 31 fixed to the slide 13 inside the respective curved slots 30 defined on the carriage 12.

The rotation of the transmission element 11 also produces a further thrust of the second connecting rod 26 on the rod 21, with the consequent further rotation of the tool 8 from the second position to the third position with a further forward movement of the operating head 7 towards the rotation axis D.

The sideways movement of the operating head 7 from the first configuration to the second configuration allows removing the section of the bead E gripped by means of the tool 8 from the respective annular flange on the rim A and moving it above the rim itself.

The further sideways movement of the tool 8 towards the third position allows maintaining a perfect grip on the bead E during the away movement from the rim A, at the same time avoiding excessive tensions and deformations of the tire C.

The rotation of the rim A by means of the clamping and rotating device 3 then allows the entire bead E to come out of the respective annular flange.

It has in fact been found how the described invention reaches the proposed standards of upgrading, and in particular, the fact is underlined that the described machine allows the correct and easy removal of the tire from the rim of a vehicle wheel.

In fact, the sideways movement of the operating head from the first to the second configuration, in a curved direction, together with the rotation of the tool from the second to the third position, allows removing the tire bead from the respective flange on the rim while maintaining a correct tool grip on the bead itself.

This further allows curbing the tensions which the tire normally undergoes during the removal operation, thereby reducing the risk of undesired deformations of the tire itself.

The presence of just two actuators operating in series together, as well as the possibility of moving the operating head, the tool and the slide by means of a single actuator, further ensures a very simple machine structure and makes the machine highly functional.

The invention thus conceived is susceptible to numerous modifications and variations, all of which falling within the scope of the inventive concept.

Furthermore all the details can be replaced with others that are technically equivalent.

In practice, the materials used, as well as the contingent shapes and dimensions, may be any according to requirements without because of this moving outside the protection scope of the following claims.

The invention claimed is:

1. A machine for fitting and removing wheel tires for vehicles, comprising
    a supporting structure of a clamping and rotating device for clamping and rotating a wheel rim for vehicles,
    at least an operating unit movable with respect to said supporting structure and having at least an operating head for fitting/removing a tire onto/from said rim, said operating head having at least one removal tool associated with a first actuator and turnable between a first clamping position of at least a section of the bead of said tire in which said tool is substantially tilted towards a rotation axis of said rim, and a second entrainment position of said bead section in which said tool extends along a direction substantially parallel to the rotation axis of said rim, wherein said operating unit comprises a second actuator and transformation arrangement for transforming the movement generated by said second actuator into the sideways movement of said operating head along a direction substantially curved between a first configuration in which said operating head is substantially near to a section of the annular flange of said rim suitable for housing said bead section, and a second configuration in which said operating head is substantially away from said section of the annular flange of the rim, wherein said operating unit comprises at least a transmission element for transmitting the movement generated by said second actuator to said tool, during the sideways movement of said operating head, for the rotation of said tool between said second position and a third position of entrainment of said section of the bead, in which said tool is substantially tilted in the opposite direction with respect to the rotation axis of said rim, and wherein said transmission element is associated with a first system of levers and with a second system of levers, wherein said first system of levers is associated with said first actuator and with said tool and said second system of levers is associated with said second actuator and with said operating head.

2. The machine according to claim 1, wherein said operating unit comprises at least a slide for supporting and moving said operating head between said first and second configurations.

3. The machine according to claim 2, wherein said operating unit comprises at least an arm which is associated with said slide and which has a free extremity with said operating head.

4. The machine according to claim 3, wherein said arm is axially sliding with respect to said slide.

5. The machine according to claim 3, wherein said arm is arranged substantially transversal with respect to the rotation axis of said rim.

6. The machine according to claim 3, wherein said arm comprises a substantially tubular outer body.

7. The machine according to claim 6, wherein said arm comprises at least a linking element of substantially elongated shape, arranged axially sliding inside said outer body, with one extremity associated with said first system of levers and the opposite extremity associated with said tool.

8. The machine according to claim 7, wherein said tool has an extremity associated with said linking element and a substantially intermediate section with a fulcrum fastened to said outer body.

9. The machine according to claim 7, wherein said linking element comprises at least a rod having an extremity associated with said first system of levers, and at least a small connecting rod hinged on the opposite extremity of said rod and hinged on an free extremity of said tool with a substantially hooked section suitable for tallying with said section of the bead.

10. The machine according to claim 2, wherein said transmission element has an extremity attached to a moving portion of said second actuator.

11. The machine according to claim 10, wherein said second system of levers comprises at least a fourth lever having an extremity hinged to said slide.

12. The machine according to claim 11, wherein said second system of levers comprises at least a fourth connecting rod having an extremity associated with said fourth lever and an opposite extremity associated with said transmission element.

13. The machine according to claim 2, wherein said operating unit comprises at least a carriage supporting said slide which is movable relative to said supporting structure.

14. The machine according to claim 13, wherein said transmission element is associated turnable with said carriage.

15. The machine according to claim 13, wherein said operating unit comprises at least a guide element for guiding the sideways movement of said operating head, and wherein said guide element comprise at least a curved slot on said carriage, inside which at least a pin associated integral with said slide is engaged sliding.

16. The machine according to claim 15, comprising a plurality of said curved slots and corresponding pins.

17. The machine according to claim 13, wherein said carriage is associated moving along an upright of said supporting structure, on top of said clamping and rotating device.

18. The machine according to claim 1, wherein said tool is substantially elongated in shape and which has a free extremity with a substantially hooked section suitable for tallying with said section of the bead.

19. The machine according to claim 1, wherein said first actuator comprises a fixed portion integral with said transmission element.

20. The machine according to claim 1, wherein said first system of levers comprises at least a first lever which has an extremity associated with a moving portion of said first actuator and which has a substantially median section with the fulcrum fastened to said transmission element.

21. The machine according to claim 20, wherein said first system of levers comprises at least a first connecting rod which is associated with said first lever, at an extremity opposite said first actuator.

22. The machine according to claim 21, wherein said first system of levers comprises at least a second lever which has an extremity associated with said first connecting rod, at an extremity opposite said first lever, and which has a substantially median section with the fulcrum fastened to said transmission element.

23. The machine according to claim 22, wherein said first system of levers comprises at least a second connecting rod which is associated with said second lever, at an extremity opposite said first connecting rod, and which is associated with said tool.

24. The machine according to claim 20, wherein said operating unit comprises at least a slide for supporting said operating head associated with said supporting structure moving between said first and second configurations, wherein said operating unit comprises at least an arm axially sliding with respect to said slide and which has a free extremity with said operating head, and wherein said first system of levers comprises at least a third connecting rod which is associated with said first lever, at an extremity opposite said first actuator, and which is associated with an outer body substantially tubular of said arm.

25. The machine according to claim 24, wherein said third connecting rod is associated with a bracket at an extremity of said outer body.

26. The machine according to claim 24, wherein said second actuator comprises a fixed portion attached to the carriage and a moving portion to which said transmission element is attached.

27. The machine according to claim 1, wherein said transmission element comprises at least a substantially plate-shaped portion.

28. The machine according to claim 1, wherein said operating unit comprises at least a guide element for guiding the sideways movement of said operating head.

29. The machine according to claim 1, wherein at least one of said first and second actuators is a linear actuator.

* * * * *